US011140059B1

(12) United States Patent
Duan

(10) Patent No.: US 11,140,059 B1
(45) Date of Patent: Oct. 5, 2021

(54) ACTIVE PATH DETECTION FOR ON-DEMAND NETWORK LINKS IN A SOFTWARE-DEFINED WIDE AREA NETWORK (SDWAN)

(71) Applicant: Fortinet, Inc., Sunnyvale, CA (US)

(72) Inventor: Shangwei Duan, Vancouver (CA)

(73) Assignee: Fortinet, Inc., Sunnyvale, CA (US)

( * ) Notice: Subject to any disclaimer, the term of this patent is extended or adjusted under 35 U.S.C. 154(b) by 0 days.

(21) Appl. No.: 16/827,976

(22) Filed: Mar. 24, 2020

(51) Int. Cl.
*H04L 12/26* (2006.01)
*H04L 29/06* (2006.01)

(52) U.S. Cl.
CPC .......... *H04L 43/10* (2013.01); *H04L 43/0858* (2013.01); *H04L 63/164* (2013.01)

(58) Field of Classification Search
CPC ..... H04L 67/12; H04L 1/0002; H04L 1/0041; H04L 1/18; H04L 5/0064; H04L 67/1097; H04L 1/0009; H04L 1/1874; H04L 67/306; H04L 43/045; H04L 12/66; H04L 29/00; H04L 47/122; H04L 41/0806; H04L 67/10; H04L 41/0893; H04L 43/08; H04L 43/10; H04L 41/082; H04L 41/145; H04L 41/147; H04L 41/16; H04L 41/046; H04L 41/12; H04L 41/5025; H04L 43/026; H04L 43/04; H04L 43/062; H04L 43/0876; H04L 45/38; H04L 63/1425; H04L 63/1458; H04L 67/14; H04L 9/3239; H04L 2209/38; H04L 41/0816; H04L 41/0843; H04L 41/5012; H04L 41/5051; H04L 43/0823; H04L 43/0852; H04L 43/0882; H04L 43/12; H04L 43/16; H04L 47/11; H04L 47/2483; H04L 63/02; H04L 63/1408; H04L 63/1433
See application file for complete search history.

(56) References Cited

U.S. PATENT DOCUMENTS

| | | | | |
|---|---|---|---|---|
| 2007/0274227 | A1* | 11/2007 | Rauscher ............ | H04L 43/0858 370/252 |
| 2009/0157901 | A1* | 6/2009 | Asati ...................... | H04L 45/02 709/238 |
| 2020/0252234 | A1* | 8/2020 | Ramamoorthi ......... | H04L 45/64 |
| 2020/0296012 | A1* | 9/2020 | Paruchuri ............... | H04L 43/50 |

OTHER PUBLICATIONS

Huang, G. et al., Cisco Systems, Inc., "A Traffic-Based Method of Detecting Dead Internet Key Exchange (IKE) Peers", Feb. 2004, 13 pages.

VMware, White Paper, "Dynamic Multipath Optimization", Nov. 2019, 18 pages.

\* cited by examiner

*Primary Examiner* — Djenane M Bayard

(57) ABSTRACT

Systems and methods are described for active path detection for on-demand network links in an SDWAN. According to one embodiment, on establishment of an on-demand network link between a first spoke device and a second spoke device of an SDWAN, the first spoke creates a health check object and periodically measures a metric representing a latency between the first and second spokes. Responsive to receipt of a packet via the on-demand network link, the first spoke determines whether the packet represents transmission of probing or user traffic. When the packet represents user traffic, the first spoke causes an idle timer associated with the on-demand network link to be restarted. When the packet represents probing traffic, the first spoke allows the idle timer to run so the on-demand network link may be removed when the idle timer expires.

20 Claims, 8 Drawing Sheets

300 ⟶

```
CONFIG SYSTEM VIRTUAL-WAN-LINK
CONFIG HEALTH-CHECK
     EDIT "HUB1"
         SET SERVER "192.168.65.206"  --- DETECTED SERVER (LOCATED AT THE HUB SIDE)
         SET MEMBERS 1   --- STATIC IPSEC LINK 1 (TO HUB)
     SET INTERVAL 500  -- PROBE SENT EVERY 500 MILLION SECONDS
     SET FAILTIME 5  --- THE LINK WILL BE CONSIDERED DOWN AFTER FAIL 5 TIMES
     SET PROTOCOL TCP-ECHO
END
END
```

```
CONFIG HEALTH-CHECK
EDIT ADVPN
SET SERVER "10.1.1.1" --- DETECTED SERVER, LEARNED FROM ADVPN PROTOCOL. IT'S SPOKE2'S ON-DEMAND INTERFACE'S IP ADDRESS;
SET INTERFACE ADVPN-LINK-TO-SPOKE2 --- ON-DEMAND INTERFACE'S NAME
SET INTERVAL 500 -- INHERITED FROM HEALTH-CHECK "HUB1"
SET FAILTIME 5 -- INHERITED FROM HEALTH-CHECK "HUB1"
SET PROTOCOL ICMP ( FORCEFULLY USING ICMP PROTOCOL, RELATED TO IMPLEMENTATION)
END
```

```
CONFIG HEALTH-CHECK
EDIT ADVPN
SET SERVER "10.1.1.2" --- DETECTED SERVER, LEARNED FROM ADVPN PROTOCOL. IT'S
SPOKE1'S ON-DEMAND INTERFACE'S IP ADDRESS;
SET INTERFACE ADVPN-LINK-TO-SPOKE1 --- ON-DEMAND INTERFACE'S NAME
SET INTERVAL 500 -- INHERITED FROM HEALTH-CHECK "HUB1"
SET FAILTIME 5 -- INHERITED FROM HEALTH-CHECK "HUB1"
SET PROTOCOL ICMP ( FORCEFULLY USING ICMP PROTOCOL, RELATED TO
IMPLEMENTATION)
END
```

| Type | Code | Checksum |
|------|------|----------|
| ID | | Sequence Number |
| New Tag | | |
| Timestamp | | |
| Timestamp | | |

FIG. 4

ACTIVE PATH DETECTION FOR ON-DEMAND NETWORK LINKS IN A SOFTWARE-DEFINED WIDE AREA NETWORK (SDWAN)

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright © 2020, Fortinet, Inc.

BACKGROUND

Field

Embodiments of the present invention generally relate to network communications. In particular, embodiments of the present invention relate to actively probing an on-demand network link of a Software-Defined Wide Area Network (SDWAN) formed between a pair of virtual private network (VPN) gateways.

Description of the Related Art

In a hub and spoke wide area network (WAN) topology, multiple network devices (remote peers or spokes) communicate with a central network device (the hub), for example, in a data center. Endpoints associated with spoke sites may communicate with endpoints associated with the hub site via respective spokes and the hub using separate and secured tunnels that extend between each individual spoke and the hub. Such a topology allows branch offices of an enterprise (e.g., the spoke sites) to access resources that may be centrally located within a data center of the enterprise. A Software Defined-Wide Area Network (SDWAN) simplifies management and operation of a WAN by decoupling networking hardware from the control mechanisms that handle network policies and determine availability of network bandwidth for appropriate routing of traffic.

The combination of SDWAN and Internet Protocol Security (IPSec) Virtual Private Network (VPN) technology has been widely accepted in the market for providing both intelligent route steering and secured data. The introduction of on-demand network links (e.g., Auto-discovery VPN (ADVPN)), however, poses a dilemma in the context of an SDWAN. On one hand, such an on-demand network link, which may be dynamically established as a shortcut between a pair of spokes of a traditional hub and spoke architecture, should be continuously monitored/detected (e.g., with probe packets) to measure the shortcut's real time quality for optimal route steering. On the other hand, ADVPN, in particular, cannot distinguish between probes and user traffic. As such, existing probing techniques are incompatible with the traditional use of a shortcut idle timer to determine when the shortcut can be torn down because the probe packets themselves being sent over the shortcut will cause the shortcut to be retained indefinitely. This in turn may create scalability issues and results in wasted resources at the spokes.

SUMMARY

Systems and methods are described for active path detection for on-demand network links in a Software Defined Wide Area Network (SDWAN). According to one embodiment, on establishment of an on-demand network link between a first spoke device and a second spoke device of a SDWAN having a hub and spoke topology, the first spoke device creates a health check object for the on-demand network link to detect link quality of the on-demand network link. In accordance with the health check object, the first spoke periodically measures a metric representing a latency between the first spoke and the second spoke via the on-demand network link by transmitting a probe request packet to the second spoke device via the on-demand network link, where a header of the probe request packet contains a predefined or configurable tag, a sequence number and a time stamp. In response to receiving a packet via the on-demand network link, the first device determines whether the packet represents transmission of probing traffic on the on-demand network link or transmission of user traffic on the on-demand network link based on one or both of a protocol associated with the packet and presence of the predefined or configurable tag within a header of the packet. When the packet is determined to represent the transmission of user traffic on the on-demand network link, the first spoke causes an idle timer associated with the on-demand network link to be restarted. Alternately, when the packet is determined to represent the transmission of probing traffic on the on-demand network link, the first spoke allows the idle timer to run.

BRIEF DESCRIPTION OF THE DRAWINGS

In the Figures, similar components and/or features may have the same reference label. Further, various components of the same type may be distinguished by following the reference label with a second label that distinguishes among the similar components. If only the first reference label is used in the specification, the description is applicable to any one of the similar components having the same first reference label irrespective of the second reference label.

FIG. 3A-C are code fragments illustrating dynamic configuration of a heath check object during a first probing phase in accordance with an embodiment of the present invention.

FIG. 4 depicts a header of an ICMP probe packet associated with a second probing phase in accordance with an embodiment of the present invention.

DETAILED DESCRIPTION

Figure 1:
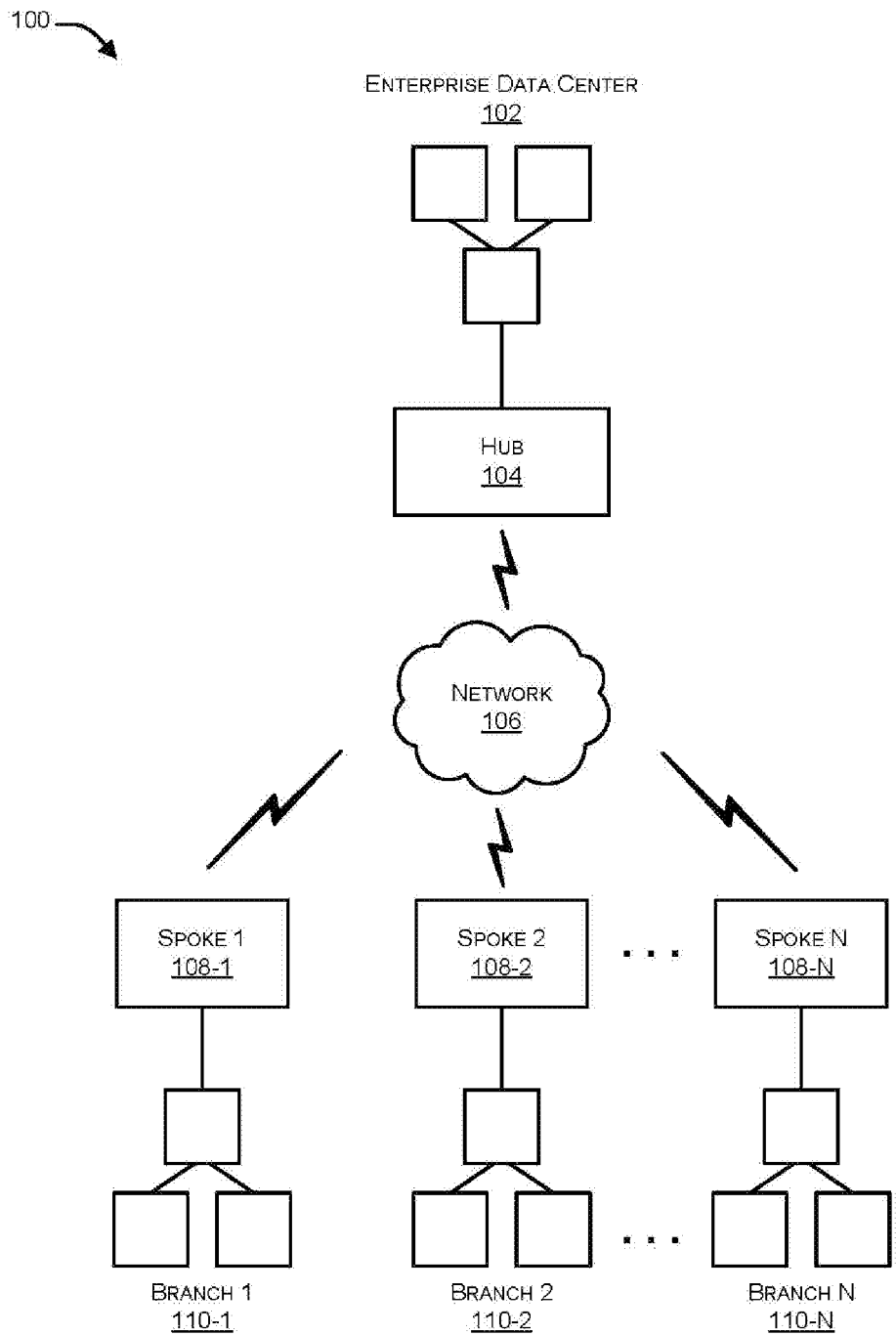
FIG. 1 illustrates a simplified architecture representing a hub and spoke topology in which in aspects of the present invention can be implemented in accordance with an embodiment of the present invention.

Systems and methods are described for active path detection for on-demand network links in a Software Defined Wide Area Network (SDWAN).

In the following description, numerous specific details are set forth in order to provide a thorough understanding of embodiments of the present invention. It will be apparent to one skilled in the art that embodiments of the present invention may be practiced without some of these specific details.

Embodiments of the present invention include various steps, which will be described below. The steps may be performed by hardware components or may be embodied in machine-executable instructions, which may be used to cause a general-purpose or special-purpose processor programmed with the instructions to perform the steps. Alternatively, steps may be performed by a combination of hardware, software, firmware and/or by human operators.

Embodiments of the present invention may be provided as a computer program product, which may include a machine-readable storage medium tangibly embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware).

Various methods described herein may be practiced by combining one or more machine-readable storage media containing the code according to the present invention with appropriate standard computer hardware to execute the code contained therein. An apparatus for practicing various embodiments of the present invention may involve one or more computers (or one or more processors within a single computer) and storage systems containing or having network access to computer program(s) coded in accordance with various methods described herein, and the method steps of the invention could be accomplished by modules, routines, subroutines, or subparts of a computer program product.

Terminology

Brief definitions of terms used throughout this application are given below.

The terms "connected" or "coupled" and related terms are used in an operational sense and are not necessarily limited to a direct connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

If the specification states a component or feature "may", "can", "could", or "might" be included or have a characteristic, that particular component or feature is not required to be included or have the characteristic.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The phrases "in an embodiment," "according to one embodiment," and the like generally mean the particular feature, structure, or characteristic following the phrase is included in at least one embodiment of the present disclosure, and may be included in more than one embodiment of the present disclosure. Importantly, such phrases do not necessarily refer to the same embodiment.

As used herein, an "on-demand network link" generally refers to a network link that is dynamically created on-demand between two spokes of a hub and spoke topology. A non-limiting example of an on-demand network link is a shortcut path, for example, created by ADVPN technology that allows two spokes to establish a direct tunnel with each other to avoid routing through the topology's hub device.

As used herein, a "network security appliance" or a "network security device" generally refers to a device or appliance in virtual or physical form that is operable to perform one or more security functions. Some network security devices may be implemented as general-purpose computers or servers with appropriate software operable to perform the one or more security functions. Other network security devices may also include custom hardware (e.g., one or more custom Application Specific Integrated Circuits (ASICs)). A network security device is typically associated with a particular network (e.g., a private enterprise network) on behalf of which it provides the one or more security functions. The network security device may reside within the particular network that it is protecting or network security may be provided as a service with the network security device residing in the cloud. Non-limiting examples of security functions include authentication, next-generation firewall protection, antivirus scanning, content filtering, data privacy protection, web filtering, network traffic inspection (e.g., secure sockets layer (SSL) or Transport Layer Security (TLS) inspection), intrusion prevention, intrusion detection, denial of service attack (DoS) detection and mitigation, encryption (e.g., Internet Protocol Secure (IPSec), TLS, SSL), application control, Voice over Internet Protocol (VoIP) support, Virtual Private Networking (VPN), data leak prevention (DLP), antispam, antispyware, logging, reputation-based protections, event correlation, network access control, vulnerability management, and the like. Such security functions may be deployed individually as part of a point solution or in various combinations in the form of a unified threat management (UTM) solution. Non-limiting examples of network security appliances/devices include network gateways, VPN appliances/gateways, UTM appliances (e.g., the FORTIGATE family of network security appliances), messaging security appliances (e.g., FORTIMAIL family of messaging security appliances), database security and/or compliance appliances (e.g., FORTIDB database security and compliance appliance), web application firewall appliances (e.g., FORTIWEB family of web application firewall appliances), application acceleration appliances, server load balancing appliances (e.g., FORTIBALANCER family of application delivery controllers), vulnerability management appliances (e.g., FORTISCAN family of vulnerability management appliances), configuration, provisioning, update and/or management appliances (e.g., FORTIMANAGER family of management appliances), logging, analyzing and/or reporting appliances (e.g., FORTIANALYZER family of network security reporting appliances), bypass appliances (e.g., FORTIBRIDGE family of bypass appliances), Domain Name Server (DNS) appliances (e.g., FORTIDNS family of DNS appliances), wireless security appliances (e.g., FORTI-WIFI family of wireless security gateways), and DoS attack detection appliances (e.g., the FORTIDDOS family of DoS attack detection and mitigation appliances).

Exemplary embodiments will now be described more fully hereinafter with reference to the accompanying drawings, in which exemplary embodiments are shown. This invention may, however, be embodied in many different forms and should not be construed as limited to the embodiments set forth herein. These embodiments are provided so that this invention will be thorough and complete and will fully convey the scope of the invention to those of ordinary skill in the art. Moreover, all statements herein reciting embodiments of the invention, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, illustrations, and the like represent conceptual views or processes illustrating systems and methods embodying this invention. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this invention. Those of ordinary skill in the art further understand that the exemplary hardware, software, processes, methods, and/or operating systems described herein are for illustrative purposes and, thus, are not intended to be limited to any particular named.

Systems and methods are described for active path detection for on-demand network links in a Software Defined Wide Area Network (SDWAN). According to one embodiment, on establishment of an on-demand network link between a first spoke device and a second spoke device of an SDWAN having a hub and spoke topology, the first spoke device creates a health check object for the on-demand network link to detect link quality of the on-demand network link. In accordance with the health check object, the first spoke periodically measures a metric representing a latency between the first spoke and the second spoke via the on-demand network link by transmitting a probe request packet to the second spoke device via the on-demand network link, where a header of the probe request packet contains a predefined or configurable tag, a sequence number and a time stamp. In response to receiving a packet via the on-demand network link, the first device determines whether the packet represents transmission of probing traffic on the on-demand network link or transmission of user traffic on the on-demand network link based on one or both of a protocol associated with the packet and presence of the predefined or configurable tag within a header of the packet. When the packet is determined to represent the transmission of user traffic on the on-demand network link, the first spoke causes an idle timer associated with the on-demand network link to be restarted. Alternately, when the packet is determined to represent the transmission of probing traffic on the on-demand network link, the first spoke allows the idle timer to run.

FIG. 1 illustrates a simplified architecture 100 representing a hub and spoke topology in which aspects of the present invention can be implemented in accordance with an embodiment of the present invention. In the context of the present example, the remote sites (e.g., branch networks 110-1, 110-2 . . . 110-N (which may be collectively referred to as branches 110 and may be individually referred to as branch 110, hereinafter)) are communicatively coupled with an enterprise data center 102 through a network 106 using spokes 108-1, 108-2 . . . 108-N (which may be collectively referred to as spokes 108 and which may be individually referred to as spoke 108, hereinafter) and a hub 104. Thus, branches 110 can be considered as spokes of a bicycle wheel, which connect to hub of the bicycle wheel i.e. enterprise data center 102.

In context of network architecture 100, connections (e.g., virtual private network connections) from a central network unit (i.e., hub 104) radiate to a number of remote spokes 108. Hub 104 can enable connectivity between enterprise data center 102 and branches 110 corresponding to the spokes 108 and can also act as a gateway for spokes 108 to communicate with each other. Thus, traffic can pass between enterprise data center 102 behind hub 104 and branches 110 behind corresponding spokes 108. Further, when no site-to-site connections exist between spokes 108 or when such connections exist but the route though the hub 104 is the selected route, hub 104 may also facilitate communication of traffic among branches 110 behind corresponding spokes 108.

Those skilled in the art will appreciate that, network 106 in architecture 100 may include wireless networks, wired networks or a combination thereof that can be implemented as one of the different types of networks, such as an Intranet, a Local Area Network (LAN), a Wide Area Network (WAN), Internet, and the like. Further, the networks can be dedicated networks or shared networks. A shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like. Further, hub 104 and spokes 108 can be implemented using any network device, network security device or computing device.

Embodiments of the present disclosure are explained herein with reference to three sequential phases. The first phase is associated with dynamically creating a health check object for each on-demand network link (e.g., an ADVPN link) between a first spoke (e.g., 108-1) and a second spoke (e.g., 108-2). In the second phase, each spoke 108 participating in a particular on-demand link may periodically transmit probe request packets with a special tag contained within the header of the probe request packets to the other spoke 108 participating in the particular on-demand link. The third phase may be performed at an interface of a spoke 108 receiving network traffic via the on-demand network link, in which a packet received via the on-demand network link is checked to determine if an idle timer relating to the on-demand network link should be refreshed or allowed to run. Additional details regarding these phases are explained further below with reference to FIGS. 2A and 2B.

Figure 2A:
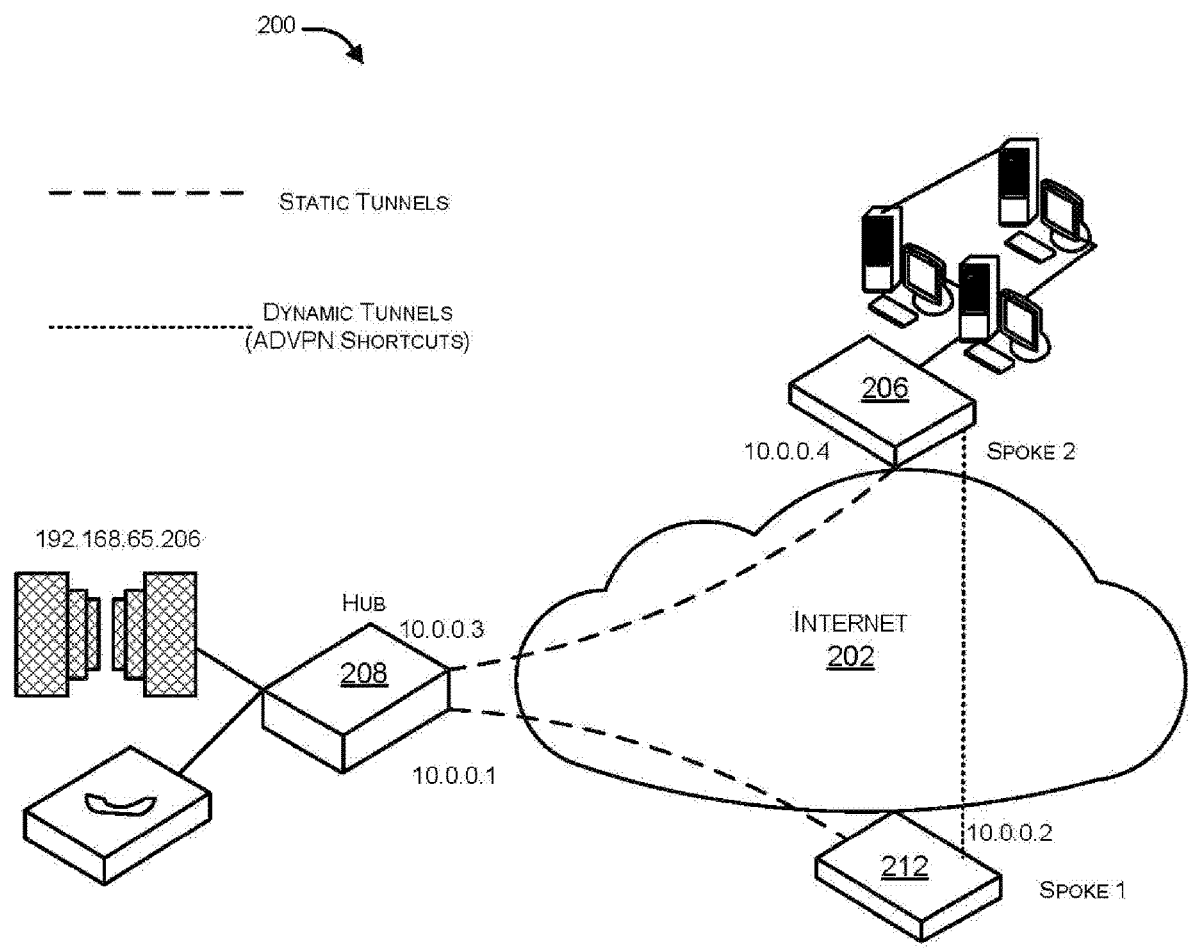
FIG. 2A is a simplified topology illustrating how ADVPN runs within an SDWAN infrastructure.
Figure 2B:
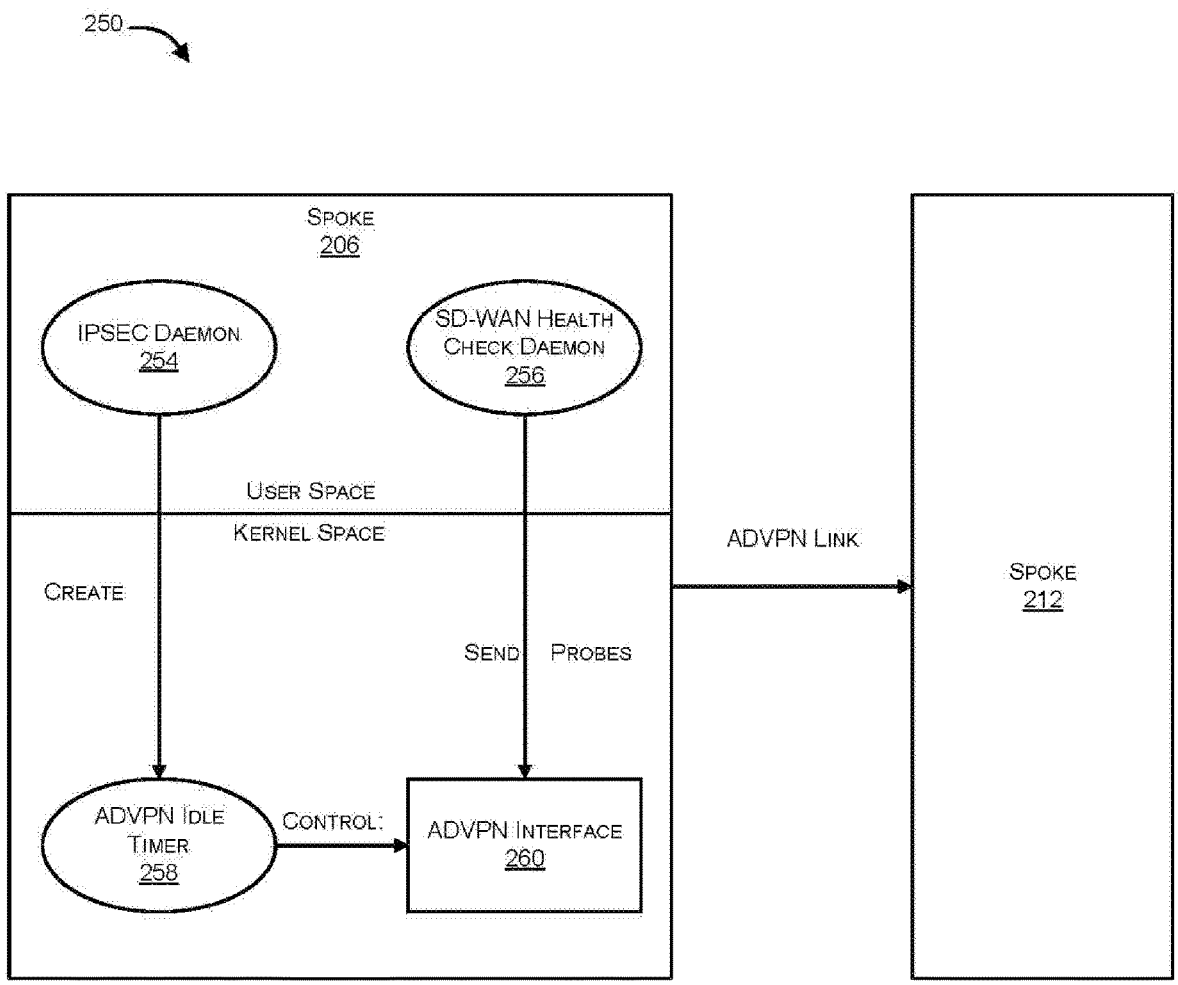
FIG. 2B illustrates a software architecture of a spoke in accordance with an embodiment of the present invention.

FIG. 2A is a simplified topology 200 illustrating how ADVPN runs within an SDWAN infrastructure. As illustrated, two spokes 206 and 212 may establish an on-demand network link including an ADVPN tunnel to allow network traffic to be exchanged between the two spokes 206 and 212 without traversing a hub 208. FIG. 2B illustrates a software architecture 250 of a spoke in accordance with an embodiment of the present invention. As illustrated in architecture 250, within an operating system running on spoke 206, two daemons run within the user space, including an IPSEC daemon 254 and an SDWAN health check daemon 256. IPSEC daemon 254 creates an ADVPN interface 260 and an ADVPN idle timer 258 in kernel space of the operating system, and SDWAN health check daemon 256 sends probes to one or more SDWAN peers (e.g., second spoke 212) through ADVPN interface 260. In a traditional implementation, every packet passing through the ADVPN interface 260 would cause the ADVPN idle timer 258 to be refreshed; however, according to an embodiment of the present disclosure, a probe packet including the special tag in the header can be distinguished from user network traffic traversing the ADVPN link and therefore refreshing the ADVPN idle timer 258 for non-user network traffic can be avoided. In this manner, the ADVPN link can be probed to measure the quality of the link without interfering with the ADVPN idle timer 258, which determines when the ADVPN link should be torn down due to inactivity on the ADVPN link.

Referring to software architecture 250 and network topology 200, spoke 206 establishes the on-demand network link with spoke 212 of an SDWAN such that in response to establishment of the on-demand network link, IPSec daemon 254 running on spoke 206 creates a kernel-mode timer process that maintains ADVPN idle timer 258. The kernel-mode timer process may also create ADVPN interface 260 associated with the on-demand network link. During the first phase, spoke 206 creates a health check object for the on-demand network link to detect link quality of the on-demand network link. According to an implementation, spoke 206 dynamically creates a health check object for each on-demand network link. Those skilled in the art will appreciate that as the ADVPN link is created on-demand during the run-time of network devices, sufficient information is not available to assign a health-check object to an ADVPN link until after the ADVPN link has been established. Therefore in an implementation, during creation of a configuration file while configuring the SDWAN, SDWAN administrator can create a template health-check object for the hub that can be used by the spokes to create their respective health check objects as needed. An exemplary health check object is discussed below with reference to FIGS. 3A, 3B and 3C.

In the context of the present example, in accordance with the dynamically created health check object, during the second stage, spoke 206 periodically measures a metric representing a latency between spoke 206 and spoke 212 via the on-demand network link by transmitting a probe request packet to spoke 212 via the on-demand network link. The transmitting is performed by using SDWAN health check daemon 256 running on spoke 206 to send the probe request packet via ADVPN interface 260 such that a header of the probe request packet contains a predefined or configurable tag, a sequence number and a time stamp. During this phase, the first spoke may periodically send out tagged probe request packets (e.g., Internet Control Message Protocol (ICMP) probe request packets) to the second spoke. A non-limiting example of an ICMP probe request packet is described further below with reference to FIG. 4.

In response to receiving a packet by spoke 206 via the on-demand network link by spoke 206, during the third stage, spoke 206 determines whether the packet represents transmission of probing traffic on the on-demand network link or transmission of user traffic on the on-demand network link based on one or both of a protocol associated with the packet and presence of the predefined or configurable tag within the header of the packet. In one embodiment, the determining includes sequentially checking whether the protocol is a probing protocol, whether a subtype identified within the header of the packet is a probing subtype, and whether the header of the packet contains the predefined or configurable tag. The probing protocol can include one of ICMP, Transmission Control Protocol (TCP), TCP Echo, User Datagram Protocol (UDP), UDP Echo or Two-Way Active Measurement Protocol (TWAMP).

When the packet is determined to represent the transmission of user traffic on the on-demand network link, spoke 206 causes an idle timer associated with the on-demand network link to be restarted by, for example, allowing the SDWAN health check daemon 256 to update a data store monitored by the kernel-mode timer process with statistical information regarding the user traffic. While when the packet is determined to represent the transmission of probing traffic on the on-demand network link, spoke 206 allows ADVPN idle timer 258 to run. Those skilled in the art will appreciate that in response to expiration of the idle timer, the kernel-mode timer process causes ADVPN interface 260 to be removed. Therefore, during this phase the packets traversing ADVPN interface 260 are checked and ADVPN interface 260 is removed when the ADVPN idle timer 258 expires. Further details regarding example phase 3 processing are explained below with reference to FIG. 5.

FIGS. 3A-C are code fragments 300, 330 and 360 illustrating dynamic configuration of a heath check object during a first probing phase in accordance with an embodiment of the present invention.

According to an embodiment, SDWAN administrator can create a template health-check object 300 within a configuration file during configuration of the SDWAN, where the link to be monitored may be the link to the hub and the detected server can be a server located at the hub side. Example configuration 300 defines a health-check object that may be used to create probe traffic to measure the quality from a spoke to its corresponding hub, which also works as a template health-check object for performing ADVPN link health-checks, when a dynamic ADVPN link is established.

During run-time, after an ADVPN tunnel is established, a new health-check object can be created based on the previously configured template, where the detected server can be acquired from the ADVPN protocol messages. For example, responsive to establishment of an ADVPN tunnel, the participating spokes may dynamically create respective health-check objects by inheriting certain parameter values (e.g., interval and failtime) from the template and customizing other parameter values (e.g., server, member link and protocol) based on the ADVPN protocol. Representation 330 and 360 are examples of corresponding auto-generated health-check objects for the first spoke and the second spoke respectively.

FIG. 4 depicts a header 400 of an ICMP probe packet associated with a second probing phase in accordance with an embodiment of the present invention.

In one embodiment, the first 8 bytes of the ICMP probe packet include a type, a code, a checksum, an ID and a sequence number consistent with a standard ICMP header. Immediately after such elements of a standard header, embodiments of the present disclosure insert a special tag of 4 bytes, which is identified as "new tag" in header 400. Those skilled in the art will appreciate that the special tag can include any string of characters, however, well-known strings such as OSPF, BGP, FTP and the like can be excluded to avoid misinterpretation. In one implementation, the special TAG can be "0x4C4E4B4D" which is an ASCII code representation of "LNKM" (an abbreviation of link monitor object). Embodiments of the present disclosure also reserve 16 bytes for timestamps to be inserted into the header to record a first time at which the probe request was sent by the originating device to the destination device and a second time at which the probe response was received by the originating device from the destination device so that the round trip latency may be calculated by subtracting the first time (probe sent time) from the second time (response received time).

The processing described below with reference to the flow diagrams of FIGS. 5-6 may be implemented in the form of executable instructions stored on a machine readable medium and executed by a processing resource (e.g., a microcontroller, a microprocessor, central processing unit core(s), an application-specific integrated circuit (ASIC), a field programmable gate array (FPGA), and the like) and/or in the form of other types of electronic circuitry. For example, processing may be performed by one or more virtual or physical computer systems of various forms, such as the computer system described with reference to FIG. 7 below.

Figure 5:
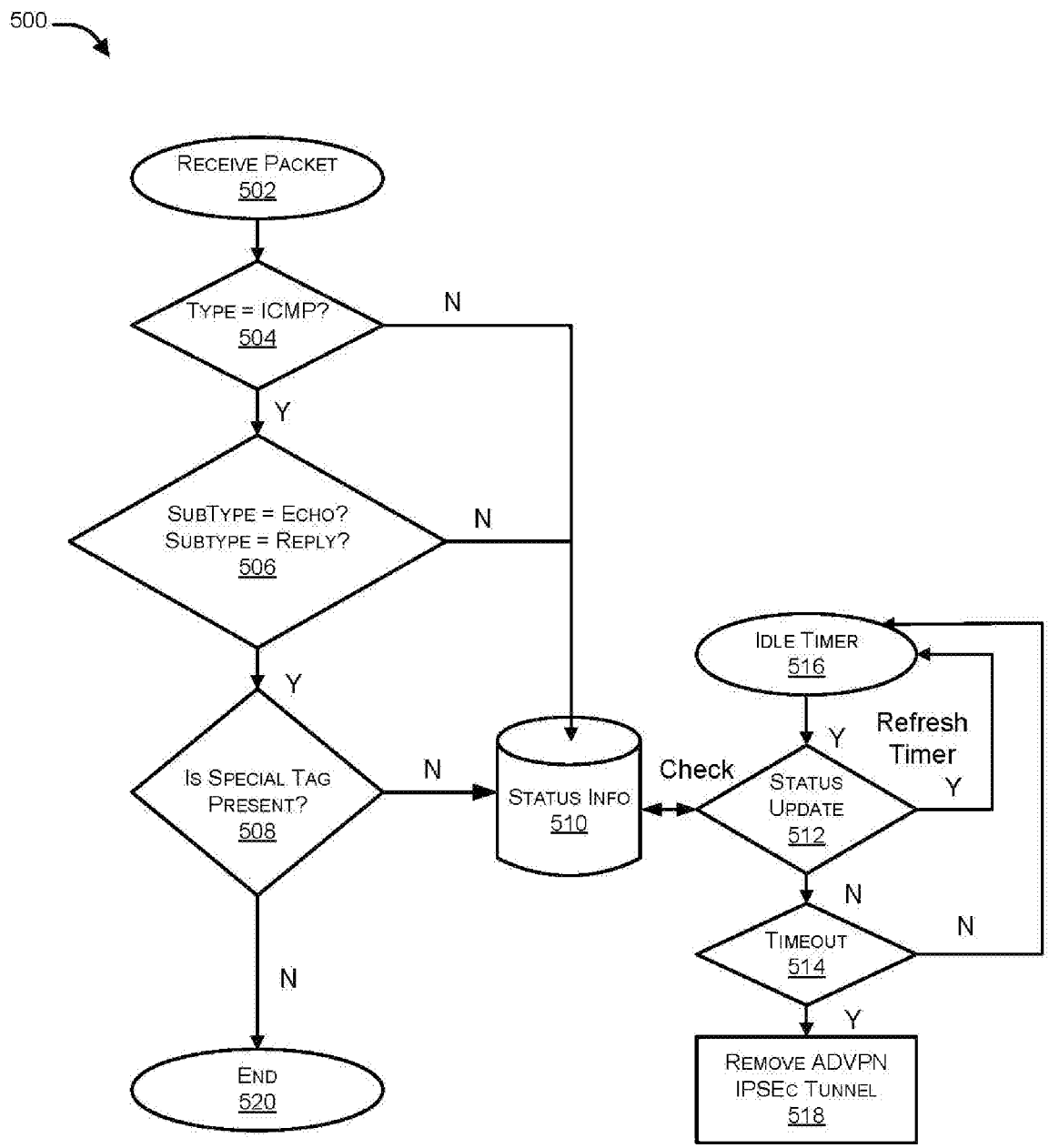
FIG. 5 is a flow diagram associated with a third probing phase in accordance with an embodiment of the present invention.

FIG. 5 is a flow diagram 500 associated with a third probing phase in accordance with an embodiment of the present invention.

In the context of the present example, two different threads are illustrated, a receive packet thread 502 and an idle timer thread 516.

In the receive packet thread 502, responsive to receipt of a packet via an on-demand network link (e.g., an ADVPN link) by a spoke (e.g., spoke 206), for example, at an ADVPN interface (e.g., ADVPN interface 260), the protocol, type and special tag can be checked sequentially at decision blocks 504, 506 and 508, respectively.

According to one embodiment, any failure of the checks at decision blocks 504, 506 or 508 is indicative of the packet representing user traffic and results in information (e.g., statistical information regarding user traffic received via the on-demand network link) being written to status info database 510 (which is read by the idle timer thread 516 to determine whether to reset the idle timer).

If all of the checks at decision blocks 504, 506 and 508 succeed, the status info database 510 is not updated and therefore, the idle timer will continue to run.

At decision block 512 of the idle timer thread 516, it is determined whether a status update has been made to the status info database 510. If not, then processing continues with decision block 514; otherwise, the idle timer is refreshed (reset) to retain the ADVPN link. According to one embodiment, decision block 512 may be triggered responsive to storage of statistical information regarding received user traffic to the status info database 510. Alternatively or additionally, decision block 512 may be triggered responsive to expiration of a timer representing a fraction of the idle timer.

At decision block 514, it is determined whether the idle timer has expired. If so, then processing continues with block 518; otherwise processing loops back to the top of the thread.

At block 518, as the idle timer has expired, the ADVPN IPSec tunnel is removed.

Figure 6:
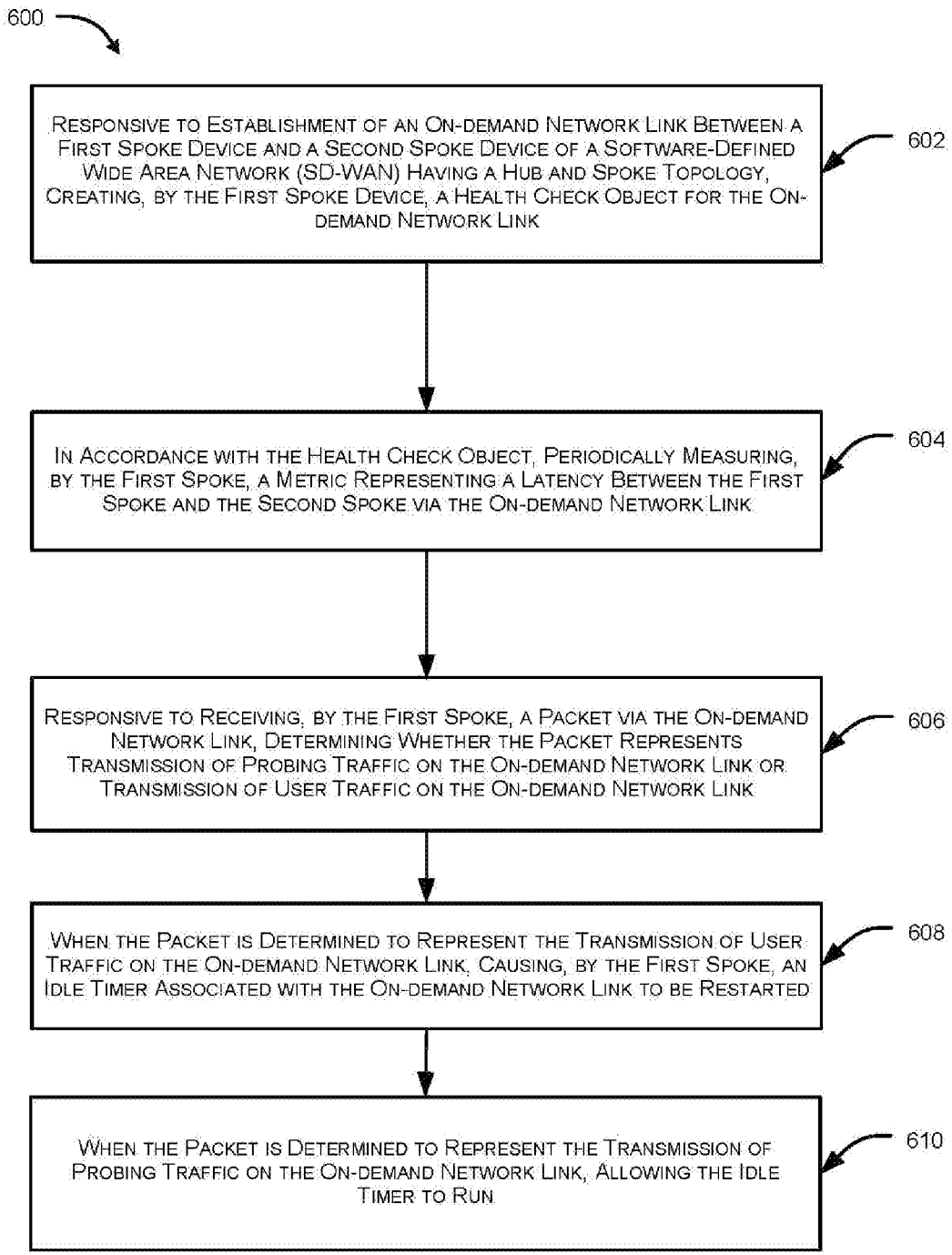
FIG. 6 is a flow diagram illustrating active path detection processing in accordance with an embodiment of the present invention.

FIG. 6 is a flow diagram 600 illustrating active path detection processing in accordance with an embodiment of the present invention. In the context of the present example, responsive to establishment of an on-demand network link between a first spoke device and a second spoke device of a Software-Defined Wide Area Network (SDWAN) having a hub and spoke topology, at block 602, the first spoke device creates a health check object for the on-demand network link to detect link quality of the on-demand network link.

At block 604, in accordance with the health check object, the first spoke periodically measures a metric representing a latency between the first spoke and the second spoke via the on-demand network link by transmitting a probe request packet to the second spoke device via the on-demand network link. According to one embodiment, a header of the probe request packet contains a predefined or configurable tag, a sequence number and a time stamp.

At block 606, responsive to receiving a packet by the first spoke via the on-demand network link, the first spoke determines whether the packet represents transmission of probing traffic on the on-demand network link or transmission of user traffic on the on-demand network link based on one or both of a protocol associated with the packet and presence of the predefined or configurable tag within the header of the packet.

At block 608, when the packet is determined to represent the transmission of user traffic on the on-demand network link, the first spoke causes an idle timer associated with the on-demand network link to be restarted. Alternately, at block 610, when the packet is determined to represent the transmission of probing traffic on the on-demand network link, the first spoke allows the idle timer to run so the on-demand network link may be removed when the idle timer expires.

Embodiments of the present disclosure include various steps, which have been described above. A variety of these steps may be performed by hardware components or may be embodied on a computer-readable storage medium in the form of machine-executable instructions, which may be used to cause a general-purpose or special-purpose processor programmed with instructions to perform these steps. Alternatively, the steps may be performed by a combination of hardware, software, and/or firmware.

Figure 7:
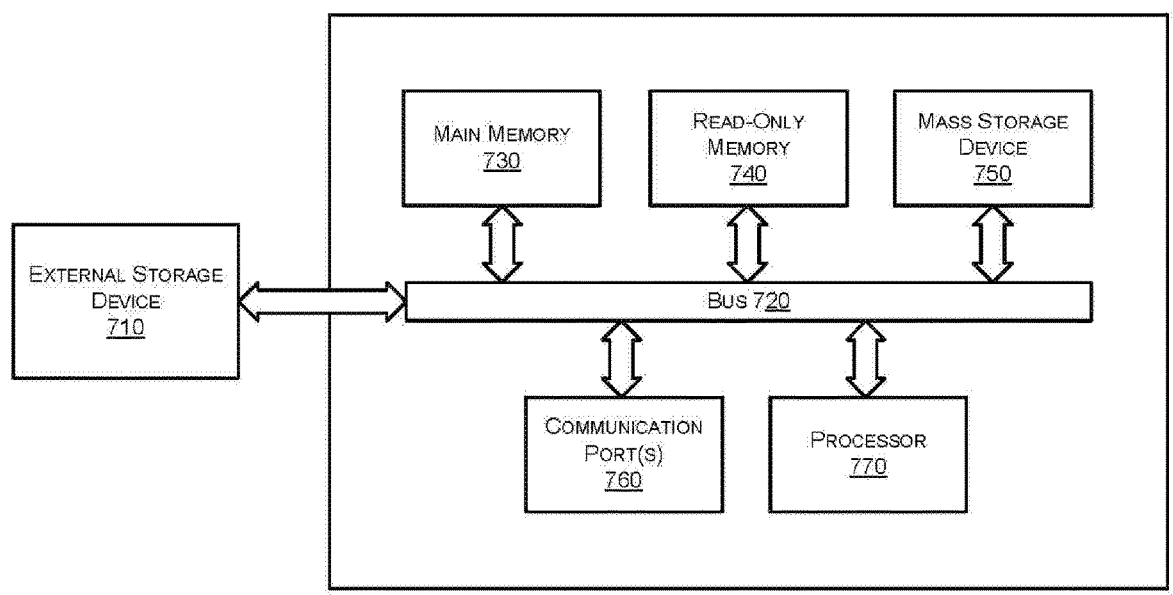
FIG. 7 illustrates an exemplary computer system in which or with which embodiments of the present invention may be utilized.

FIG. 7 illustrates an exemplary computer system 700 in which or with which embodiments of the present invention may be utilized. As shown in FIG. 7, computer system includes an external storage device 710, a bus 720, a main memory 730, a read only memory 740, a mass storage device 750, a communication port 760, and a processor 770. In one embodiment, computer system 700 may represent some portion of a network device (e.g., spokes 108-1, 108-2, . . . 108-N or hub device 104-1 of FIG. 1).

Those skilled in the art will appreciate that computer system 700 may include more than one processor 770 and communication ports 760. Examples of processor 770 include, but are not limited to, an Intel® Itanium® or Itanium 2 processor(s), or AMD® Opteron® or Athlon MP® processor(s), Motorola® lines of processors, Forti-SOC™ system on a chip processors or other future processors. Processor 770 may include various modules associated with embodiments of the present invention.

Communication port 760 can be any of an RS-232 port for use with a modem based dialup connection, a 10/100 Ethernet port, a Gigabit or 10 Gigabit port using copper or fiber, a serial port, a parallel port, or other existing or future ports. Communication port 760 may be chosen depending on a network, such a Local Area Network (LAN), Wide Area Network (WAN), or any network to which computer system connects.

Memory 730 can be Random Access Memory (RAM), or any other dynamic storage device commonly known in the art. Read only memory 740 can be any static storage device(s) e.g., but not limited to, a Programmable Read Only Memory (PROM) chips for storing static information e.g. start-up or BIOS instructions for processor 770.

Mass storage 750 may be any current or future mass storage solution, which can be used to store information and/or instructions. Exemplary mass storage solutions include, but are not limited to, Parallel Advanced Technology Attachment (PATA) or Serial Advanced Technology Attachment (SATA) hard disk drives or solid-state drives (internal or external, e.g., having Universal Serial Bus (USB) and/or Firewire interfaces), e.g. those available from Seagate (e.g., the Seagate Barracuda 7200 family) or Hitachi (e.g., the Hitachi Deskstar 7K1000), one or more optical discs, Redundant Array of Independent Disks (RAID) storage, e.g. an array of disks (e.g., SATA arrays), available from various vendors including Dot Hill Systems Corp., LaCie, Nexsan Technologies, Inc. and Enhance Technology, Inc.

Bus 720 communicatively couples processor(s) 770 with the other memory, storage and communication blocks. Bus 720 can be, e.g. a Peripheral Component Interconnect (PCI)/PCI Extended (PCI-X) bus, Small Computer System Interface (SCSI), USB or the like, for connecting expansion cards, drives and other subsystems as well as other buses, such a front side bus (FSB), which connects processor 770 to software system.

Optionally, operator and administrative interfaces, e.g. a display, keyboard, and a cursor control device, may also be coupled to bus 720 to support direct operator interaction with computer system. Other operator and administrative interfaces can be provided through network connections connected through communication port 760. External storage device 710 can be any kind of external hard-drives, floppy drives, IOMEGA® Zip Drives, Compact Disc-Read Only Memory (CD-ROM), Compact Disc-Re-Writable (CD-RW), Digital Video Disk-Read Only Memory (DVD-ROM). Components described above are meant only to exemplify various possibilities. In no way should the aforementioned exemplary computer system limit the scope of the present disclosure.

While embodiments of the present invention have been illustrated and described, it will be clear that the invention is not limited to these embodiments only. Numerous modifications, changes, variations, substitutions, and equivalents will be apparent to those skilled in the art, without departing from the spirit and scope of the invention, as described in the claims.

Thus, it will be appreciated by those of ordinary skill in the art that the diagrams, schematics, illustrations, and the like represent conceptual views or processes illustrating systems and methods embodying this invention. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this invention. Those of ordinary skill in the art further understand that the exemplary hardware, software, processes, methods, and/or operating systems described herein are for illustrative purposes and, thus, are not intended to be limited to any particular named.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously. Within the context of this document terms "coupled to" and "coupled with" are also used euphemistically to mean "communicatively coupled with" over a network, where two or more devices are able to exchange data with each other over the network, possibly via one or more intermediary device.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C and N, the text should be interpreted as requiring only one element from the group, not A plus N, or B plus N, etc.

While the foregoing describes various embodiments of the invention, other and further embodiments of the invention may be devised without departing from the basic scope thereof. The scope of the invention is determined by the claims that follow. The invention is not limited to the described embodiments, versions or examples, which are included to enable a person having ordinary skill in the art to make and use the invention when combined with information and knowledge available to the person having ordinary skill in the art.

What is claimed is:

1. A method comprising:
   responsive to establishment of an on-demand network link between a first spoke device and a second spoke device of a Software-Defined Wide Area Network (SDWAN) having a hub and spoke topology, creating, by the first spoke device, a health check object for the on-demand network link to detect link quality of the on-demand network link;
   in accordance with the health check object, periodically measuring, by the first spoke, a metric representing a latency between the first spoke and the second spoke via the on-demand network link by transmitting a probe request packet to the second spoke device via the on-demand network link, wherein a header of the probe request packet contains a predefined or configurable tag, a sequence number and a time stamp;
   responsive to receiving, by the first spoke, a packet via the on-demand network link, determining whether the packet represents transmission of probing traffic on the on-demand network link or transmission of user traffic on the on-demand network link based on one or both of a protocol associated with the packet and presence of the predefined or configurable tag within the header of the packet;
   when the packet is determined to represent the transmission of user traffic on the on-demand network link, causing, by the first spoke, an idle timer associated with the on-demand network link to be restarted; and
   when the packet is determined to represent the transmission of probing traffic on the on-demand network link, allowing the idle timer to run.

2. The method of claim 1, further comprising responsive to establishment of the on-demand network link, creating, by an Internet Protocol Security (IPSec) daemon running on the first spoke, a kernel-mode timer process that maintains the idle timer.

3. The method of claim 2, further comprising causing, by the kernel-mode timer process, an interface associated with the on-demand network link to be created.

4. The method of claim 3, wherein said transmitting a probe request packet to the second spoke device via the on-demand network link comprises a health check daemon running on the first spoke sending the probe request packet via the interface.

5. The method of claim 3, further comprising responsive to expiration of the idle timer, causing, by the kernel-mode timer process, the interface to be removed.

6. The method of claim 4, wherein said causing, by the first spoke, an idle timer associated with the on-demand network link to be restarted comprises updating, by the health check daemon, a data store monitored by the kernel-mode timer process with statistical information regarding the user traffic.

7. The method of claim 1, wherein said determining includes sequentially checking whether the protocol is a probing protocol, whether a subtype identified within the header of the packet is a probing subtype, and whether the header of the packet contains the predefined or configurable tag.

8. The method of claim 7, wherein the probing protocol comprises one of Internet Control Message Protocol (ICMP), Transmission Control Protocol (TCP), User Datagram Protocol (UDP) or Two-Way Active Measurement Protocol (TWAMP).

9. The method of claim 1, wherein the health check daemon runs in user space of the spoke.

10. The method of claim 1, wherein the on-demand network link comprises an Auto-discovery Virtual Private Network (ADVPN) Link.

11. The method of claim 1, wherein the probing protocol is any of Internet Control Message Protocol (ICMP), Transmission Control Protocol (TCP), TCP Echo, User Datagram Protocol (UDP), UDP Echo and Two Way Active Measurement Protocol (TWAMP).

12. A non-transitory computer-readable storage medium embodying a set of instructions, which when executed by one or more processors of a first spoke device associated with a Software-Defined Wide Area Network (SDWAN), causes the one or more processors to perform a method comprising:
responsive to establishment of an on-demand network link between the first spoke device and a second spoke device of the SDWAN having a hub and spoke topology, creating, by the first spoke device, a health check object for the on-demand network link to detect link quality of the on-demand network link;
in accordance with the health check object, periodically measuring, by the first spoke, a metric representing a latency between the first spoke and the second spoke via the on-demand network link by transmitting a probe request packet to the second spoke device via the on-demand network link, wherein a header of the probe request packet contains a predefined or configurable tag, a sequence number and a time stamp;
responsive to receiving, by the first spoke, a packet via the on-demand network link, determining whether the packet represents transmission of probing traffic on the on-demand network link or transmission of user traffic on the on-demand network link based on one or both of a protocol associated with the packet and presence of the predefined or configurable tag within the header of the packet;
when the packet is determined to represent the transmission of user traffic on the on-demand network link, causing, by the first spoke, an idle timer associated with the on-demand network link to be restarted; and
when the packet is determined to represent the transmission of probing traffic on the on-demand network link, allowing the idle timer to run.

13. The non-transitory computer-readable storage medium of claim 12, further comprising responsive to establishment of the on-demand network link, creating, by an Internet Protocol Security (IPSec) daemon running on the first spoke, a kernel-mode timer process that maintains the idle timer.

14. The non-transitory computer-readable storage medium of claim 13, further comprising causing, by the kernel-mode timer process, an interface associated with the on-demand network link to be created.

15. The non-transitory computer-readable storage medium of claim 14, wherein said transmitting a probe request packet to the second spoke device via the on-demand network link comprises a health check daemon running on the first spoke sending the probe request packet via the interface.

16. The non-transitory computer-readable storage medium of claim 14, further comprising responsive to expiration of the idle timer, causing, by the kernel-mode timer process, the interface to be removed.

17. The non-transitory computer-readable storage medium of claim 15, wherein said causing, by the first spoke, an idle timer associated with the on-demand network link to be restarted comprises updating, by the health check daemon, a data store monitored by the kernel-mode timer process with statistical information regarding the user traffic.

18. The non-transitory computer-readable storage medium of claim 12, wherein said determining includes sequentially checking whether the protocol is a probing protocol, whether a subtype identified within the header of the packet is a probing subtype, and whether the header of the packet contains the predefined or configurable tag.

19. The non-transitory computer-readable storage medium of claim 18, wherein the probing protocol comprises one of Internet Control Message Protocol (ICMP), Transmission Control Protocol (TCP), User Datagram Protocol (UDP) or Two-Way Active Measurement Protocol (TWAMP).

20. A first spoke device, implemented at least partially in hardware and comprising:
a processor;
a network interface; and
a memory comprising modules including:
a first module, responsive to establishment of an on-demand network link between the first spoke device and a second spoke device of a Software-Defined Wide Area Network (SDWAN) having a hub and spoke topology, to create a health check object for the on-demand network link to detect link quality of the on-demand network link;
a second module, in accordance with the health check object, to periodically measure a metric representing a latency between the first spoke and the second spoke via the on-demand network link by transmitting a probe request packet to the second spoke device via the on- demand network link, wherein a header of the probe request packet contains a predefined or configurable tag, a sequence number and a time stamp;

a third module, responsive to receiving a packet via the on-demand network link, to determine whether the packet represents transmission of probing traffic on the on-demand network link or transmission of user traffic on the on-demand network link based on one or both of a protocol associated with the packet and presence of the predefined or configurable tag within the header of the packet;

a fourth module, when the packet is determined to represent the transmission of user traffic on the on-demand network link, to cause an idle timer associated with the on-demand network link to be restarted, and when the packet is determined to represent the transmission of probing traffic on the on-demand network link, allow the idle timer to run.

* * * * *